United States Patent
Kudo

(10) Patent No.: US 9,268,842 B2
(45) Date of Patent: Feb. 23, 2016

(54) INFORMATION PROCESSING APPARATUS, CONTROL METHOD FOR THE SAME, AND COMPUTER-READABLE RECORDING MEDIUM

(71) Applicant: CANON KABUSHIKI KAISHA, Tokyo (JP)

(72) Inventor: Tomonori Kudo, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 328 days.

(21) Appl. No.: 14/045,245

(22) Filed: Oct. 3, 2013

(65) Prior Publication Data
US 2014/0122505 A1    May 1, 2014

(30) Foreign Application Priority Data
Oct. 30, 2012    (JP) .................. 2012-239438

(51) Int. Cl.
*G06Q 10/06* (2012.01)
*G06F 17/30* (2006.01)

(52) U.S. Cl.
CPC ...... *G06F 17/30687* (2013.01); *G06Q 10/0633* (2013.01)

(58) Field of Classification Search
None
See application file for complete search history.

(56) References Cited

U.S. PATENT DOCUMENTS

| 2008/0104052 A1* | 5/2008 | Ryan et al. .......... G06F 17/2745 |
| 2014/0278350 A1* | 9/2014 | Scriffignano ....... G06F 17/2872 704/8 |

FOREIGN PATENT DOCUMENTS

| JP | 2005-63298 | 3/2005 |
| JP | 2008-84203 | 4/2008 |

* cited by examiner

*Primary Examiner* — Jason Liao
(74) *Attorney, Agent, or Firm* — Fitzpatrick, Cella, Harper & Scinto

(57) ABSTRACT

A work flow is extracted based on data operation history data. Main data, which is major data within data that constitute the extracted work flow, is estimated and extracted. A name string that expresses an access path for accessing the extracted main data is analyzed, and a character string of a target element is estimated and extracted from the name string. A work flow name, which is the name of the work flow, is determined using a connection of a character string of the extracted target element.

13 Claims, 13 Drawing Sheets

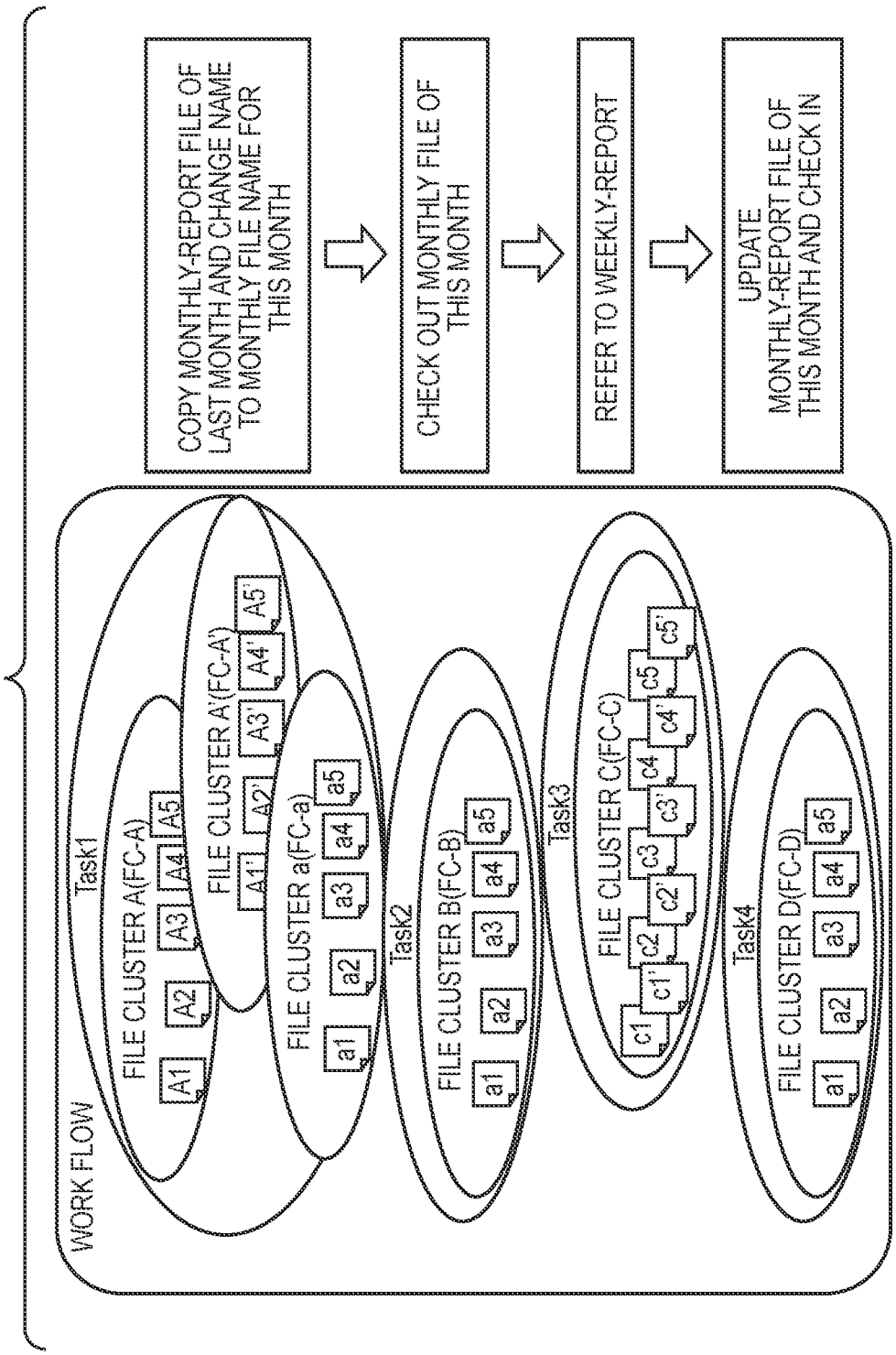

FIG. 7

| FOLDER NAME | MONTHLY-REPORT | THEME MONTHLY-REPORT | | MANAGEMENT MONTHLY-REPORT | |
|---|---|---|---|---|---|
| W1 | 5 | 5 | | 5 | 5 |
| LAYER VALUE (l) | 3 | 2 | | 3 | 2 |
| LAYER VALUE (r) | 2 | 2 | | 2 | 2 |
| STRUCTURE SCORE | 0.42 | 0.63 | | 0.42 | 0.63 |
| W2 | 0.5 | 0.5 | | 0.5 | 0.5 |
| FREQUENCY | 2 | 1 | | 1 | 2 |
| ELEMENT SCORE | 1.00 | 0.50 | | 0.50 | 1.00 |
| W3 | 1 | 1 | 1 | 1 | 1 |
| CONSTITUENT WORD | MONTHLY-REPORT | THEME | MONTHLY-REPORT | MANAGEMENT | MONTHLY-REPORT |
| FREQUENCY | 3 | 1 | 3 | 1 | 3 |
| NUMBER OF WORDS | 5 | 5 | 5 | 5 | 5 |
| CONSTITUENT WORD SCORE | 0.60 | 0.20 | 0.60 | 0.20 | 0.60 |
| TOTAL FREQUENCY | 2.02 | 1.33 | | 1.12 | 2.23 |

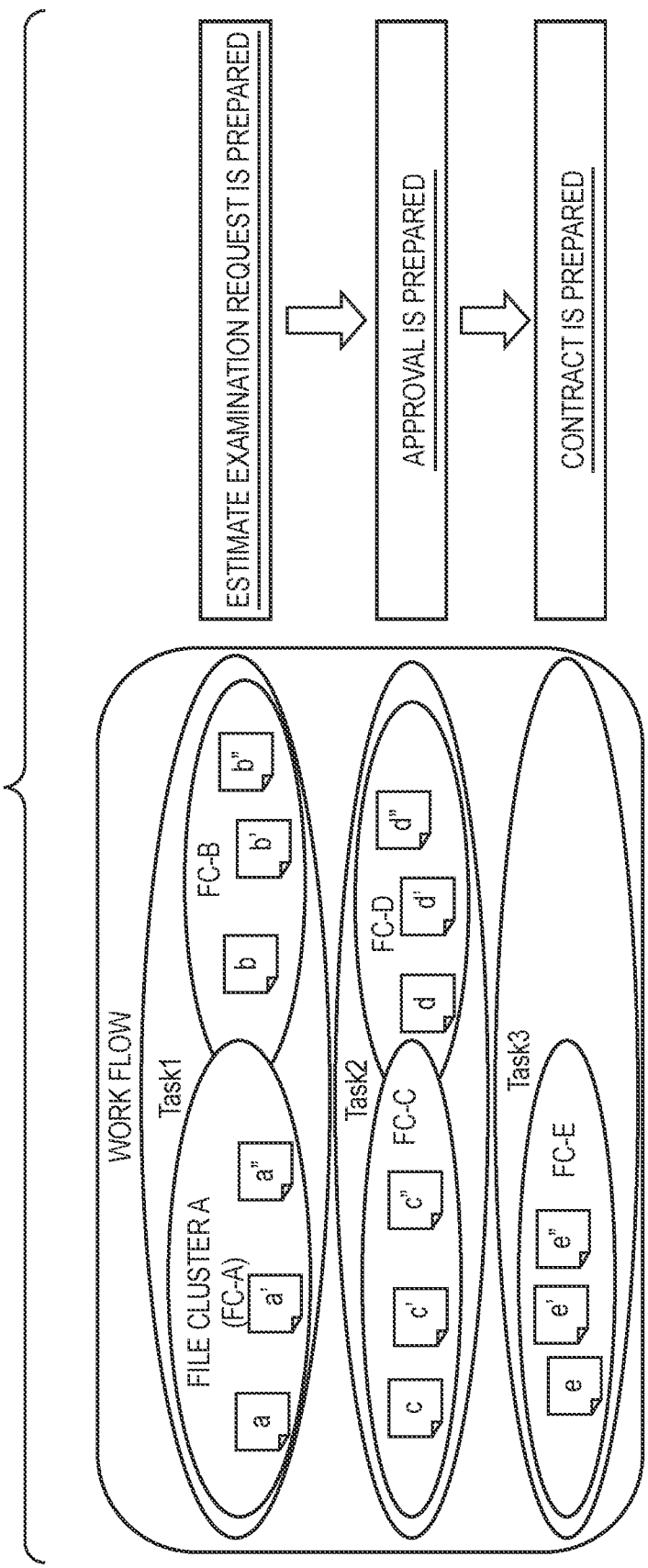

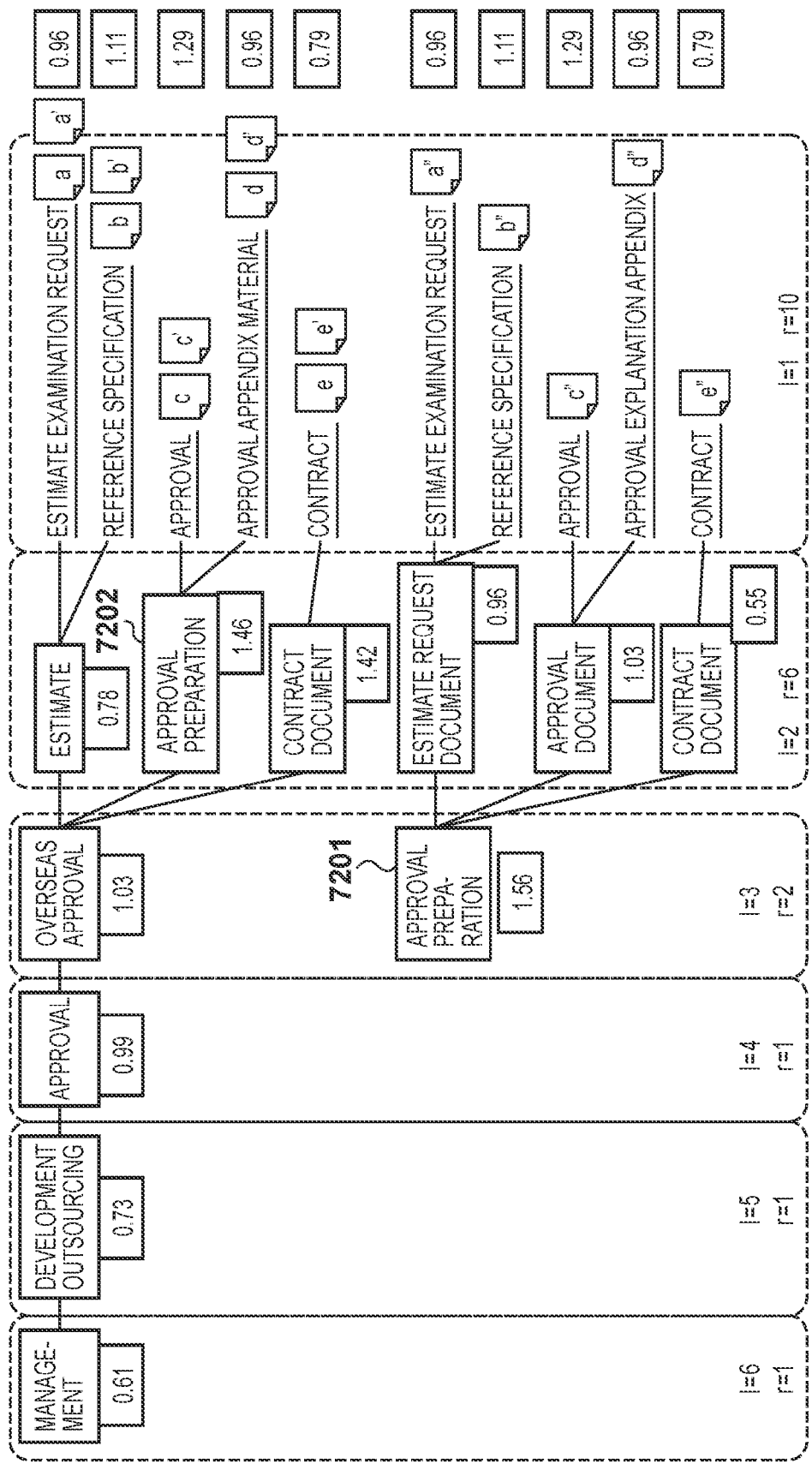

FIG. 9

RECOMMEND

MONTHLY-REPORT

Copy    APS11-IMAGE SEARCH TECHNOLOGY 201201

Rename    APS11-IMAGE SEARCH TECHNOLOGY 201201 COPY TO APS11-IMAGE SEARCH TECHNOLOGY 201201

APPROVAL PREPARATION

Check-out    IMAGE SEARCH TECHNOLOGY 2012 WRITTEN ESTIMATE EXAMINATION REQUEST

WEEKLY-REPORT

Copy    APS11-WEEKLY-REPORT 201202

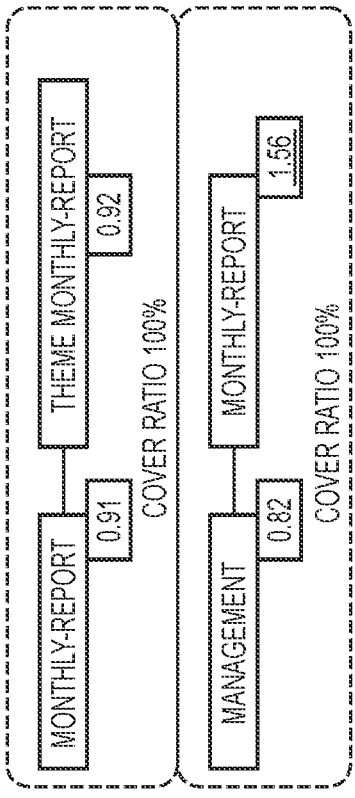
F I G. 10A
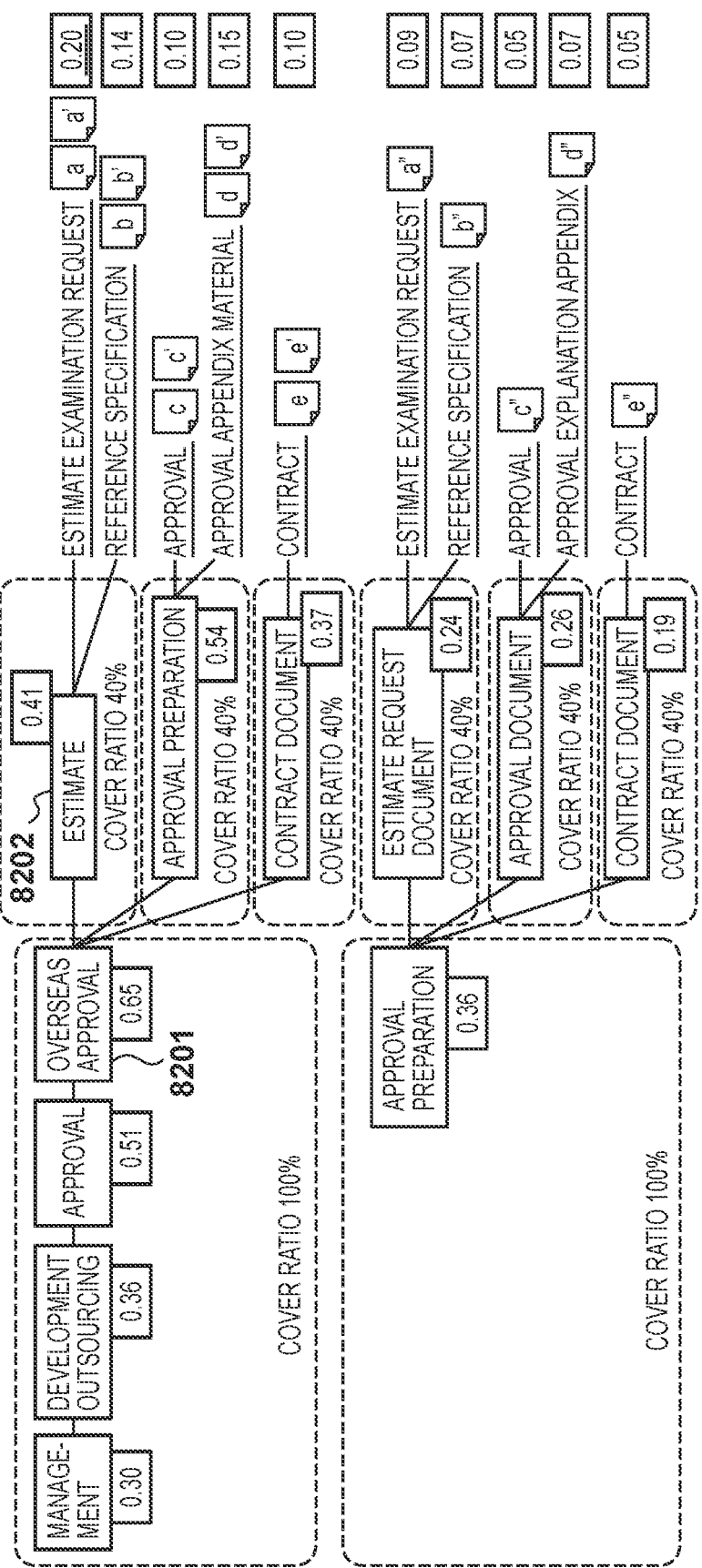
F I G. 10B

FIG. 11

| FOLDER NAME | MONTHLY-REPORT | THEME MONTHLY-REPORT | MANAGEMENT | MONTHLY-REPORT |
|---|---|---|---|---|
| RATIO TO ALL MAIN FILES C | 0.4 | 0.4 | 0.6 | 0.6 |
| W0 | 2 | 2 | 2 | 2 |
| LAYER VALUE | 3 | 2 | 3 | 2 |
| COVER RATIO | 1 | 1 | 1 | 1 |
| STRUCTURE SCORE | 0.67 | 1 | 0.67 | 1 |
| W1 | 2 | 2 | 2 | 2 |
| FREQUENCY | 2 | 1 | 1 | 2 |
| TOTAL NUMBER | 4 | 4 | 4 | 4 |
| ELEMENT SCORE | 1.00 | 0.50 | 0.50 | 1.00 |
| W2 | 1 | 1 | 1 | 1 |
|  | MONTHLY-REPORT | THEME | MONTHLY-REPORT | MANAGEMENT | MONTHLY-REPORT |
| CONSTITUENT WORD | | 1 | | | |
| FREQUENCY | 3 | 1 | 3 | 1 | 3 |
| NUMBER OF WORDS | 5 | 5 | 5 | 5 | 5 |
| CONSTITUENT WORD SCORE | 0.60 | 0.20 | 0.60 | 0.20 | 0.60 |
| TOTAL FREQUENCY | 0.91 | 0.92 | | 0.82 | 1.56 |

INFORMATION PROCESSING APPARATUS, CONTROL METHOD FOR THE SAME, AND COMPUTER-READABLE RECORDING MEDIUM

BACKGROUND OF THE INVENTION

1. Field of the Invention

The present invention relates to an information processing technique for extracting a similar operation pattern as a work flow from data operation history.

2. Description of the Related Art

A keyword matching method and the like are conventionally used as methods with which a user searches for a desired item. However, these conventional methods put a large burden on the user. In place thereof, a recommendation method is proposed for automatically searching for necessary items and presenting them to the user to save user's trouble.

One famous recommendation method is cooperative filtering, which is widespread among EC sites and the like. This is for extracting similar users whose tendency of use of items from past use history, and predicting recommendable items, using the use history of the similar users.

However, items required for business use are not only information that serves as information source for preparing information, such as internal documents and web documents. Information serving as some kind of know-how, such as processes for achieving certain jobs and methods for effectively carrying out jobs, is also searched for. There is no problem in searching for such information if it is empirically organized and clearly documented as a work flow, but if it is not clearly documented, time and trouble will be taken for searching for the information.

For this reason, various techniques are proposed for extracting a frequently appearing partial data string as a work flow from chronological use history and using it for recommendation.

Meanwhile, techniques are proposed for providing a label, a keyword, a name, or the like to a set of certain documents or the like that are classified by clustering or the like, such that what this set represents can be easily understood. The labels or the like provided to each cluster is used to narrow a search range and to classify a search result such that it can be readily checked.

Conventionally, feature words are extracted using TF*IDF or the like from words that constitute each document included in a cluster, and one or more labels or keywords to represent the cluster are determined, based on their importance. For example, in Japanese Patent Laid-Open No. 2005-63298, a score of a cluster label is calculated using the importance of words in documents included in a cluster and an inclusive relationship between the words, and one or more representative labels or keywords are determined. In Japanese Patent Laid-Open No. 2008-84203, a label is determined using knowledge data regarding the importance of words in documents included in a cluster and a parallel relationship between the words.

Conventionally, operations were only recommended based on the extracted work flow, and the meaning of the operation and the purpose of recommendation of the operation were not recognized. Therefore, it was difficult for a user to select an operation from a plurality of recommended operations.

SUMMARY OF THE INVENTION

The present invention provides a user with ease of selection when operations are recommended based on work flow estimation by displaying a work flow name together.

In the case of using a frequency such as TF*IDF of words, which is used in conventional cluster labeling, words appropriate as keywords for searching clusters are obtained, but these words do not serve as a name of a work flow with which the purpose of the work flow can be understood. The user cannot easily select an operation in the work flow. Therefore, the present invention provides generation of a name that is appropriate as a work flow name.

An information processing apparatus according to the present invention has the following configuration. That is to say, the information processing apparatus according to the present invention is an information processing apparatus for extracting a similar operation pattern as a work flow from data operation history, including: a work flow extraction unit configured to extract the work flow, based on data operation history data; a data extraction unit configured to estimate and extract main data, which is major data within data that constitutes the work flow extracted by the work flow extraction unit; a target element extraction unit configured analyze a name string that expresses an access path for accessing the main data extracted by the data extraction unit, and estimate and extract a character string of a target element from the name string; and a determination unit configured to determine a work flow name, which is a name of the work flow, using a connection of the character string of the target element extracted by the target element extraction unit.

According to the present invention, the role of a work flow and the like can be understood by displaying a work flow name together by which the purpose of the work flow can be understood at the time of recommendation of operations, thereby allowing a user to easily select a recommended operation. As a result, even when the user does not know the operation that should be performed next, the information processing apparatus can assist the user such that he/she can select a recommended operation based on the work flow name and efficiently carry out a job.

Further features of the present invention will become apparent from the following description of exemplary embodiments with reference to the attached drawings.

BRIEF DESCRIPTION OF THE DRAWINGS

FIGS. 4A and 4B are diagrams showing an exemplary work flow in the first embodiment.

FIG. 7 is a diagram showing exemplary score calculation in the first embodiment.

FIGS. 8A and 8B are diagrams showing exemplary data regarding the exemplary work flow in the first embodiment.

FIG. 9 is a diagram showing exemplary display including work flow names in the first embodiment.

FIGS. 10A and 10B are diagrams showing exemplary data regarding an exemplary work flow in the second embodiment.

FIG. 11 is a diagram showing exemplary score calculation in the second embodiment.

DESCRIPTION OF THE EMBODIMENTS

Hereinafter, embodiments of the present invention will be described in detail using the drawings.

First Embodiment

Figure 1:
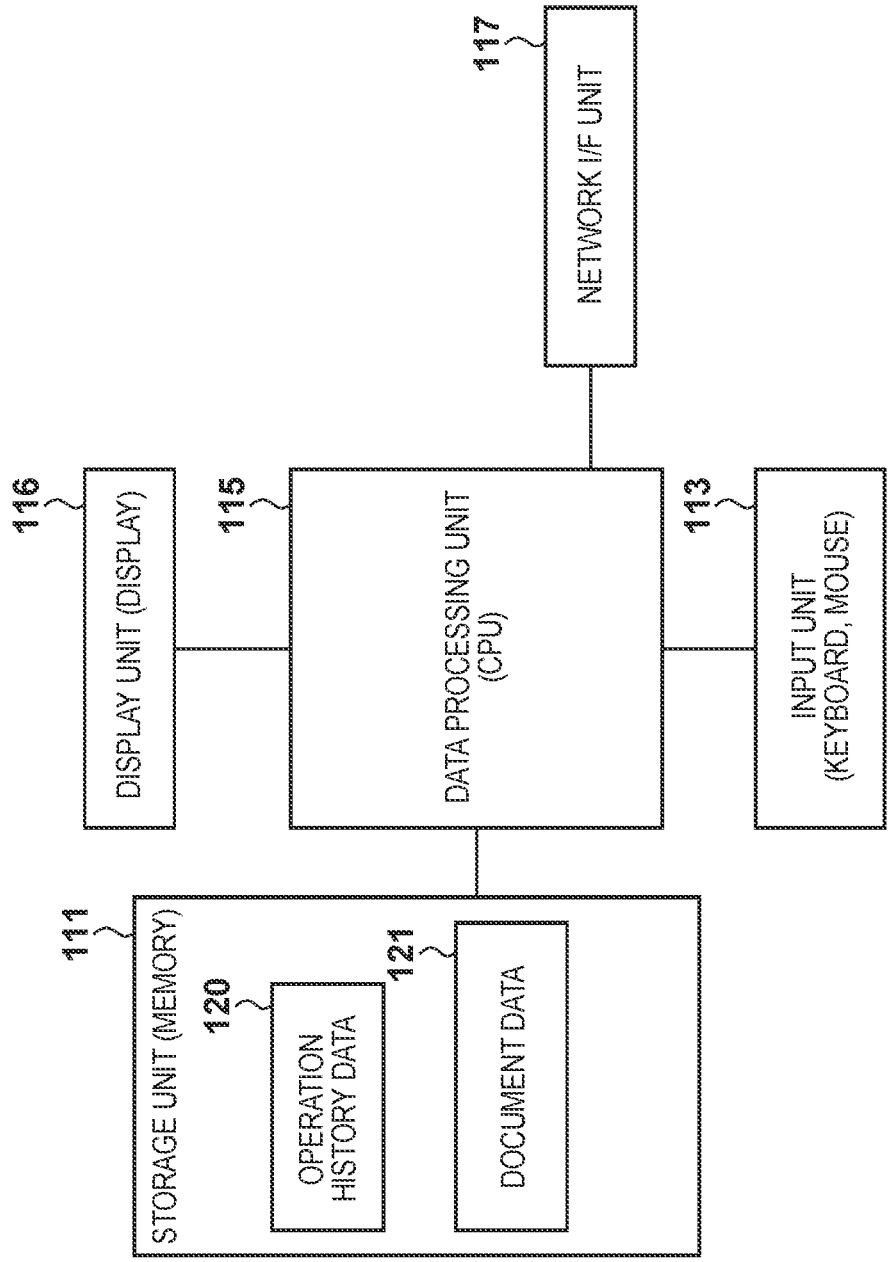
FIG. 1 is a block diagram showing an exemplary configuration of a work flow name generation device in the first embodiment.

FIG. 1 is a block diagram showing an exemplary configuration of a work flow name generation apparatus in the first embodiment.

The work flow name generation apparatus (information processing apparatus) is constituted by a data processing unit 115, which is a CPU, a storage unit 111, which is a memory, a display unit 116, which is a display, an input unit 113 such as a keyboard or a mouse, and a network I/F unit 117. The storage unit 111 stores a document data (file) group 121 and operation history data 120 regarding operations for the document data group 121.

Workflow extraction processing for extracting an operation pattern similar to a current operation as a work flow from operation history will be described first, and then, work flow name generation processing for generating a work flow name based on the extracted work flow will be described next.

Figure 2:
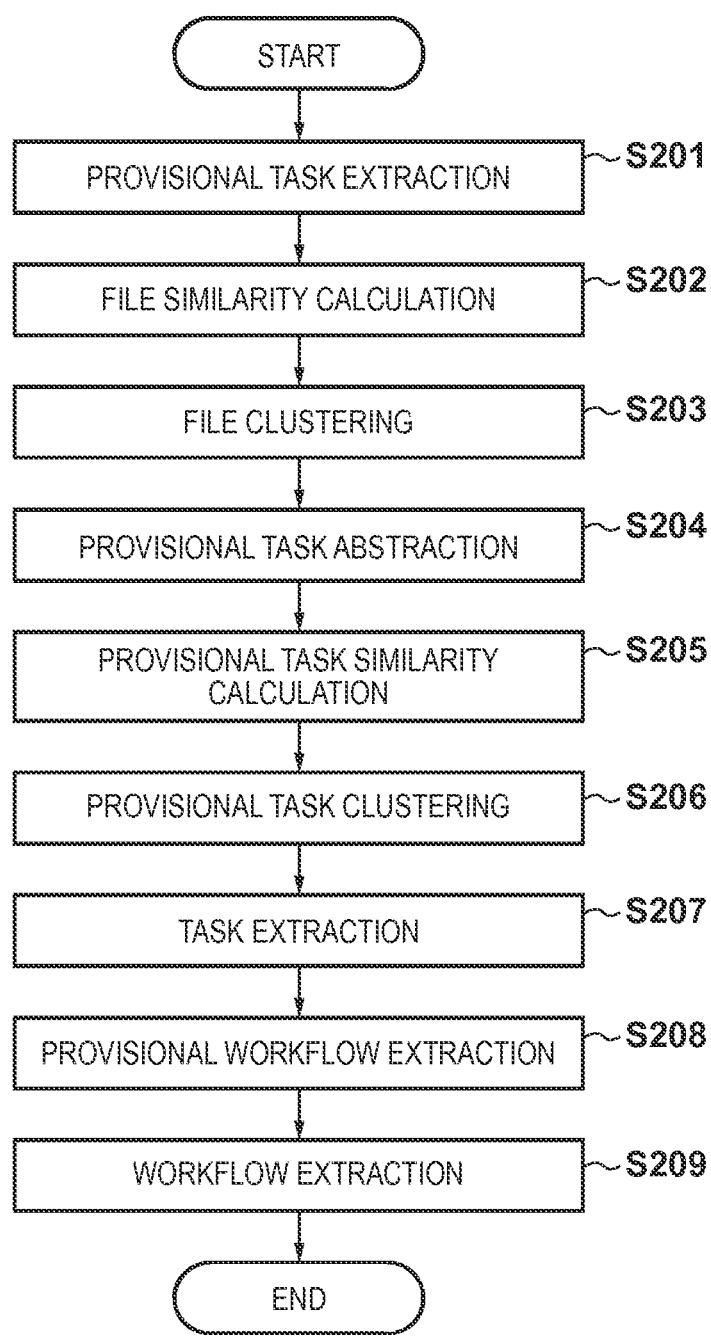
FIG. 2 is a flowchart showing work flow extraction processing in the first embodiment.

First, workflow extraction processing will be described using the flowchart in FIG. 2. This flowchart is realized by the data processing unit 115 executing a control program.

Initially, in provisional task extraction processing (step S201), the data processing unit 115 extracts file operation history of each user from the operation history data 120 including the file operation history. Next, the data processing unit 115 uses a certain division index to divide the file operation history of each user into file operation groups (hereinafter referred to as "provisional tasks"), each of which is a group of file operations that are performed during a short period of time, and generates a provisional task set, which is a set of item use operations. The certain division index may refer to, for example, a method of partitioning the file operation history at intervals of fixed time, or may refer to a method of partitioning the file operation history at a temporal gap between file operations that is longer than a certain period of time.

In file similarity calculation processing (step S202), the data processing unit 115 calculates a similarity between files. The similarity between files is not calculated simply using the similarity in the content of documents as an index, but is calculated using an index with which files that are used in a similar manner in a work are deemed to be more similar. For example, the following indexes may be used as such an index.
  relationship regarding file copy
  file structure information (XML structure)
  file cooccurrence frequency information
  file attribute information In file clustering processing (step S203), the data processing unit 115 performs clustering on the files using the similarity between the files calculated in file similarity calculation processing (step S202). There are roughly two types of clustering methods, namely a hierarchical method and a non-hierarchical method, and here, a hierarchical clustering method is used with which the number of clusters needs not be determined in advance. Representative types of the hierarchical clustering method include the nearest-neighbor method, the farthest-neighbor method, the group average method, Ward's method, and the like, and any of these can be used. Note that the description of each method, which is not essential to the present invention, will be omitted. As a result of the clustering, files that are used in a similar manner in a work are bundled into groups, and these groups of files are output as file clusters. Here, a file cluster is a bundle of one or more files, and a file that has no similar file is deemed to be an independent file cluster.

In provisional task abstraction processing (step S204), the data processing unit 115 replaces each file in the file operation groups constituting the provisional tasks generated in provisional task extraction processing (step S201) with the file cluster including the file, using the file clusters that are output in file clustering processing (step S203). This is referred to as "provisional task abstraction".

In provisional task similarity calculation processing (step S205), the data processing unit 115 calculates the similarity between the provisional tasks, using the provisional tasks that are constituted by the file clusters and are generated by the time of provisional task abstraction processing (step S204). The similarity between the provisional tasks is calculated using, as a similarity index, a degree of matching of elements in a file cluster operation set included in each provisional task. As such indexes of similarity between sets, the Jaccard coefficient, the Dice coefficient, the Simpson coefficient, and the like are known.

In provisional task clustering processing (step S206), the data processing unit 115 creates provisional task clusters by performing clustering on the provisional tasks, using the similarity between the provisional tasks calculated in provisional task similarity calculation processing (step S205). The clustering processing method is similar to the method used in file clustering processing (step S203), and will not be described here.

In task extraction processing (step S207), the data processing unit 115 extracts tasks using the provisional task clusters created in provisional task clustering processing (step S206). A "task" refers to each one of the created provisional task clusters. Here, only the provisional task cluster with the number of provisional tasks included therein being larger than or equal to a threshold value may be used as the task. It can be said that the number of provisional tasks included in a provisional task cluster being larger than or equal to the threshold value means that this task is often performed as much, and is versatile. On the contrary, the number being less than the threshold value means that the task is not very versatile and may possibly be not an important task.

In provisional workflow extraction processing (step S208), the data processing unit 115 extracts a provisional work flow constituted by a series of abstract item use operation sets, which are sequentially arranged tasks. This is file operation history of a certain user, and the provisional tasks have been extracted therefrom in provisional task extraction processing (step S201). When the provisional work flow is extracted, division between provisional tasks is performed under a certain condition.

In workflow extraction processing (step S209), the data processing unit 115 performs sequential pattern mining on the provisional work flow extracted in provisional workflow extraction processing (step S208), finds a frequently appearing task sequence, and eventually extracts it as a work flow.

Next, work flow name generation processing will be described using the flowchart in FIG. 3. This flowchart is realized by the data processing unit 115 executing a control program.

Figure 3:
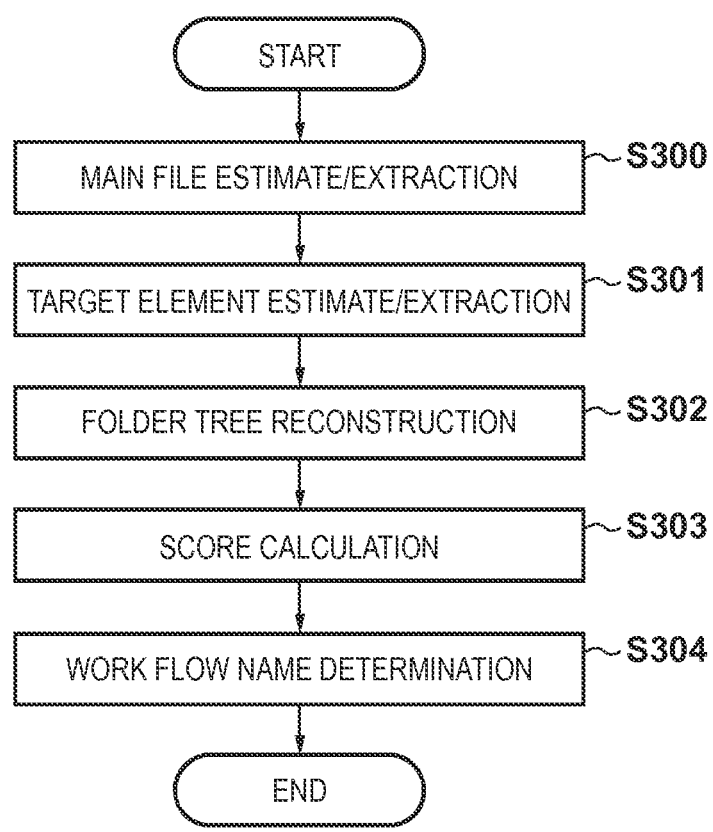
FIG. 3 is a flowchart showing work flow name generation processing in the first embodiment.

In FIG. 3, the data processing unit 115 executes processing for generating a work flow name based on a file group constituting the extracted work flow. This processing is constituted by main file estimation/extraction processing (step S300), target element estimation/extraction processing (step S301), folder tree reconstruction processing (step S302), score calculation processing (step S303), and work flow name determination processing (step S304).

FIG. 4A is an example of the extracted work flow, which is a work flow for creating a monthly-report.

In Task 1, monthly-reports of the last month (A1 to A5) are copied to obtain copy files (A1' to A5'). The names of the copied files (A1' to A5') are changed to the names of monthly-report files of this month (a1 to a5).

In Task 2, the monthly-report files of this month (a1 to a5) are checked out and start to be edited.

In Task 3, corresponding weekly-reports are referred to.

In Task 4, the monthly-reports of this month are filled in and updated, and then checked in.

Task 1 to Task 4 described above are an example of the extracted work flow.

Figure 4B:
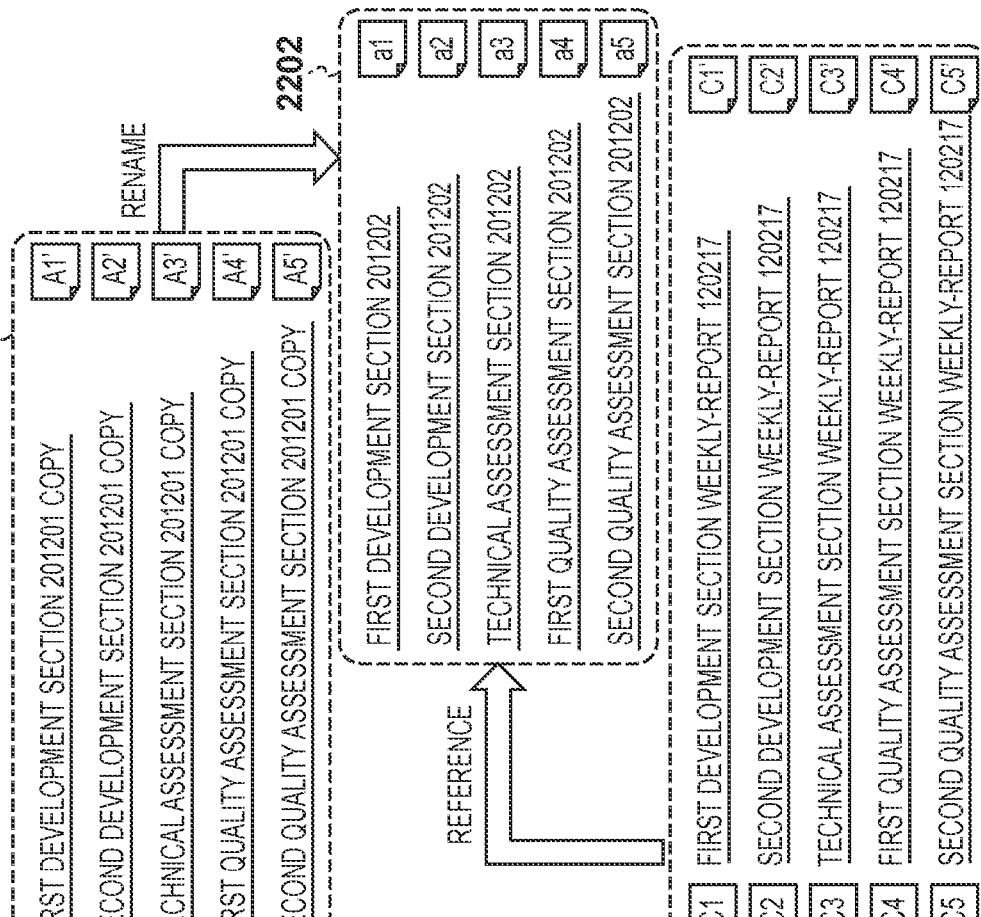

FIG. 4B is a specific example of files and operations that constitute a cluster. As shown in FIG. 4B, A1 and A1' correspond to a copy source file and a destination file, respectively. A1' and a1 correspond to a file before being renamed and a file after being renamed, respectively. The same applies to relationships between A2, A2', and a2, between A3, A3', and a3, between A4, A4', and a4, and between A5, A5', and a5.

A file group 2200 in FIG. 4B is clustered as similar files into a file cluster A(FC-A). Similarly, a file group 2201 and a file group 2202 are also clustered as similar files into a file cluster A'(FC-A') and a file cluster a(FC-a), respectively. The same applies to a file cluster B(FC-B) and a file cluster D(FC-D) in FIG. 4A.

A file C1 and a file C1' in FIG. 4B are weekly-report files that were referred to during editing of the monthly-report file a1 of this month. The relationships between C2, C2', and a2, between C3, C3', and a3, between C4, C4', and a4, and between C5, C5', and a5 are the same as the relationship between the file C1, the file C1' and the file a1. A file group 2203 in FIG. 4B is clustered as similar files into a file cluster C(FC-C).

Signs (a1 to a5) given to the files in FIGS. 4A and 4B are also used similarly in FIGS. 5A and 5B and FIGS. 6A and 6B, which will be described later.

An exemplary operation of work flow name generation processing in FIG. 3 will now be described.

Initially, in main file estimation/extraction processing (step S300), the data processing unit 115 estimates a main file based on the log type of the operation history data 120 stored in the storage unit 111. The data processing unit 115 estimates and extracts (data extraction) a main file (i.e., a major file to be used mainly) that serves as main data in the work flow from the file group of each cluster that constitutes the work flow, based on the operation type of the log. For example, a newly created file, a file obtained by copying and editing a base file, a file to be output in the work flow in the form of a print, and the like are estimated to be the main files. Only the main files are used in subsequent processing.

Figure 5A:
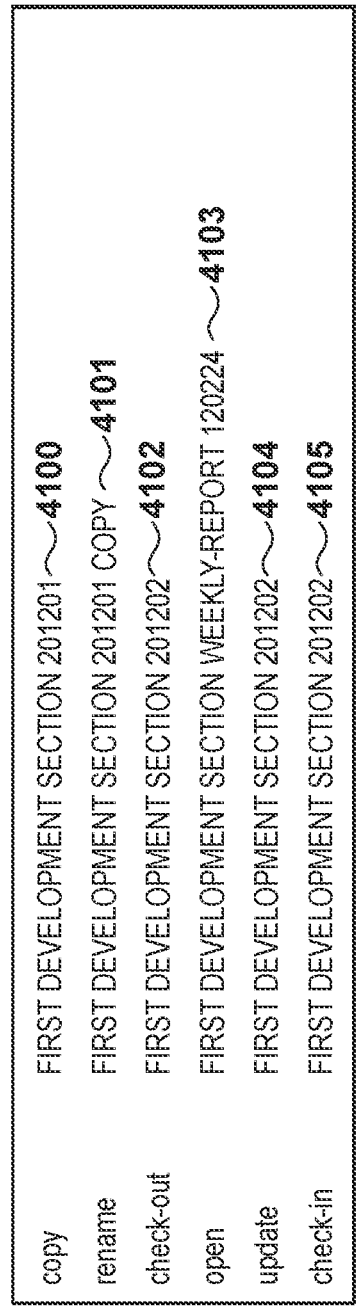
FIGS. 5A and 5B are diagrams showing exemplary data regarding the exemplary work flow in the first embodiment.

For example, FIG. 5A is an exemplary log during the work flow. Log types (operation types) and file names are sequentially recorded. Files having the log types "check-in", "update", and "check-out" are estimated to be the main files. In the case of FIG. 5A, files 4102, 4104, and 4105 that have the file name "First Development Section 201202" are estimated to be the main files. Meanwhile, if the log type of a file indicates that only copying, renaming, or opening is performed, the file is estimated to be not the main file. The files 4100, 4101, and 4103 shown in the case of FIG. 4A are estimated to be not the main files.

Figure 5B:
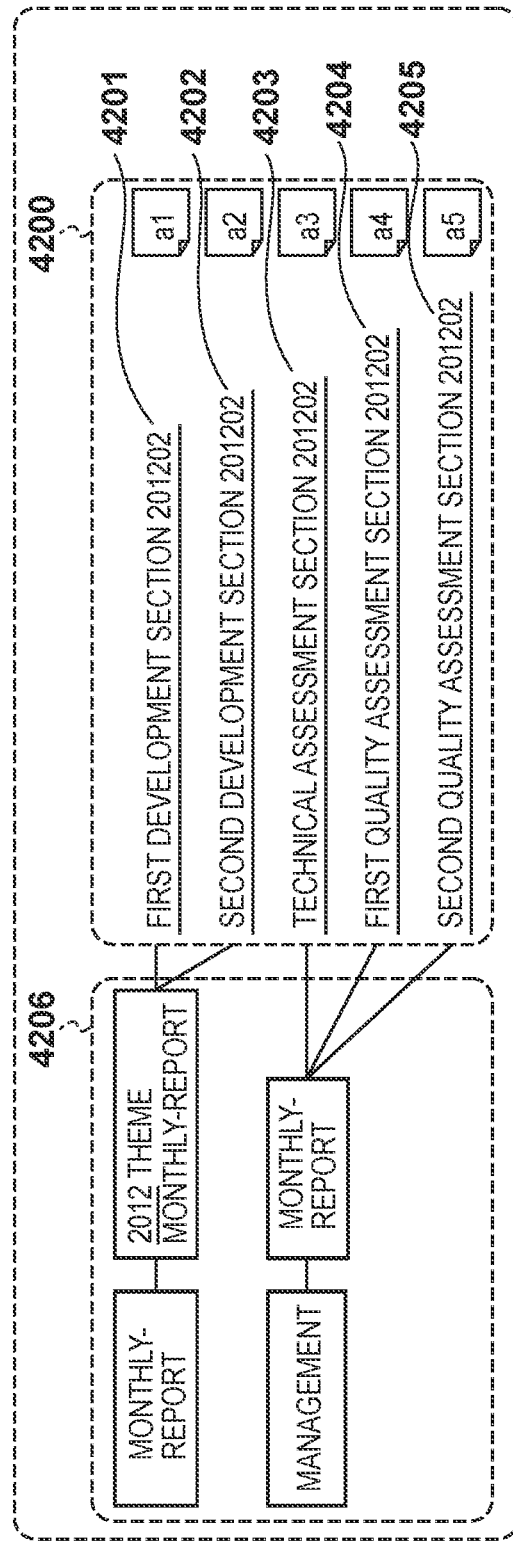

FIG. 5B shows exemplary file paths of the extracted main files. Reference numeral 4200 denotes file names, and reference numeral 4206 denotes names of folders in which the files are stored. As a result of the work flow in FIGS. 4A and 4B, five files 4201 (a1) to 4205 (a5) in FIG. 5B are extracted as the main files.

Next, in target element estimation/extraction processing (step S301), the data processing unit 115 analyzes a path (folder name and file name) of each main file extracted in main file estimation/extraction processing (step S300), and estimates and extracts (target element extraction) target elements. This extraction is performed by estimating a role of each word based on its part of speech. In this example, morphological analysis and named-entity extraction is performed on the file path. This is analysis for extracting the target elements, while similar processing can also be performed by extracting words based on character classes, and morphological analysis processing and named-entity extraction processing are not necessarily essential. The constituent elements are estimated based on the part of speech and the class of named entity.

Figure 6A:
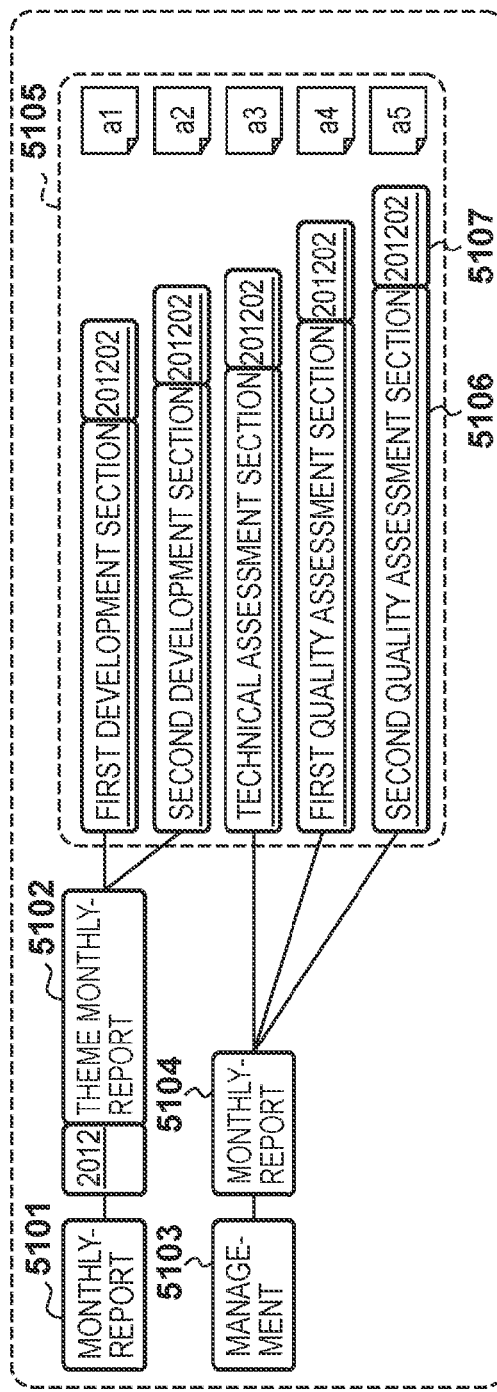
FIGS. 6A and 6B are diagrams showing exemplary data regarding the exemplary work flow in the first embodiment.

A common noun string is deemed to be a "target" element, and only target elements are used in folder tree reconstruction processing (step S302) and score calculation processing (step S303), which will be described later. A proper noun (organization name: company name, divisions), a technique name, a product name, a brand name, and the like, which are parts of speech other than a common noun, are deemed to be "subject" elements. An alphanumeric character string (including date), as denoted by reference numeral 5107 in FIG. 6A, is deemed to be an "identifier" element. A proper noun (organization, personal name), as denoted by reference numeral 5106 in FIG. 6A, is deemed to be an "author" element. The target elements are used in work flow name determination processing (step S304), which will be described later.

In an example, morphological analysis and named-entity extraction are performed on the folder names and the file names of the five main files that constitute the work flow as shown in FIG. 6A, and here, a common noun string is extracted as the target element. In the example of FIG. 6A, common noun strings "monthly-report" 5101, "theme monthly-report" 5102, "management" 5103, and "monthly-report" 5104 are extracted. These are used as candidates for the work flow name. In this example, the file names denoted by reference numeral 5105 do not include a common noun string, and therefore do not include a candidate work flow name.

In folder tree reconstruction processing (step S302), the data processing unit 115 reconstructs a folder tree (folder structure) using the target elements extracted in target element estimation/extraction processing (step S301). Only the target elements are extracted from the folder names and the file names, the folder names including no target element are removed, upper and lower layers are connected, and thus a tree based on the connection of the target elements is created. In this example, as denoted by reference numeral 5201 in FIG. 6B, the folder "2012 theme monthly-report" only includes the target element "theme monthly-report". Further, the file name having no target element is removed from the candidate work flow names. Folder trees in different systems are set to have the same layer of the main files, which are located at the deepest layer.

Next, in score calculation processing (step S303), the data processing unit 115 calculates a score indicating an evaluation value (an index indicating a degree of appropriateness as a work flow name) for the candidate work flow names on the folder trees created in folder tree reconstruction processing (step S302). The score is a total score of a structure score of a reconstructed folder tree (first term), a frequency score of a target element (second term), and a frequency score of a constituent word of the target element (third term), and is calculated using Expression 1 shown below.

The structure score of the folder tree of the first term is calculated using the distance l from the main file, which is located at the deepest layer (one-origin indexing is used here, and the distance of the main file itself is 1) and the width r of the folder tree (the number of folders or files at the same layer). A candidate having a smaller distance from the main file has a higher score, since if the folder name of the highest order is used, all work flows will have the same name. In a case where main files exist in a plurality of folders, it is desirable that the name of a higher-order folder that is used in common by all main files is applied, and therefore, a candidate having a smaller folder tree width has a higher score. Accordingly, a candidate in a layer where more folders or files are combined has a higher score.

The frequency score (element score) of a target element of the second term is a frequency at which the target element appears on a reconstructed folder tree, and a target element that appears more often on a reconstructed folder tree has a higher score.

The frequency score (constituent word score) of a constituent word of a target element of the third term is a sum of frequencies of the words constituting the target element, and a target element using more words that appear frequently on a folder tree has a higher score.

$$f(m) = W_1 * \frac{\alpha^l}{r} + W_2 * F(m) + W_3 \sum_{n=1}^{N} T_n$$

... Expression 1 f(m): candidate work flow name score m: candidate work flow name number (in the example, 1 to 4 since there are four candidates)

$W_1$: weight for first term (in the example, 5 is used as a parameter)

r: path layer frequency (a narrower folder tree width is given a higher score)

α: attenuation constant (0<α<1) (0.5 in the example)

l: distance of folder from target file (a lower-order folder having a smaller distance has a higher score)

$W_2$: weight for second term (in the example, 0.5 is used as a parameter)

F(m): occurrence frequency of mth target element $W_3$: weight for third term (in the example, 1 is used as a parameter)

N: total number of constituent words (in the example, five constituent words exist)

$T_n$: frequency of nth constituent word

Figure 6B:
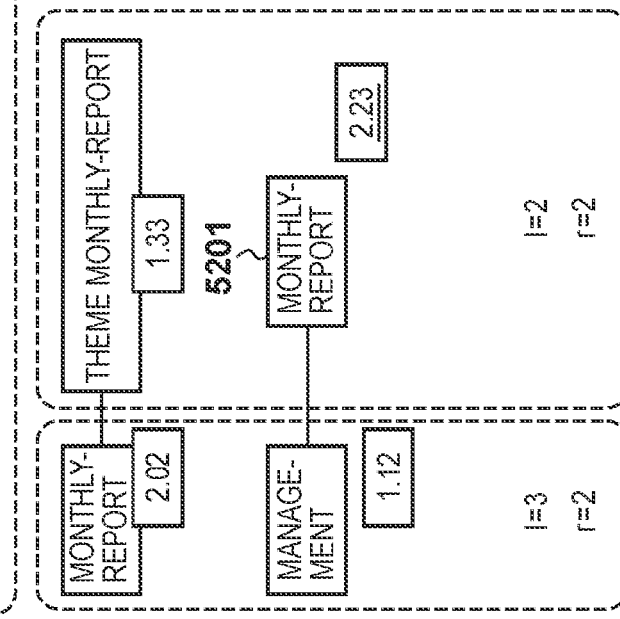

In the example in FIG. 6B, calculation is performed as follows. Since the file names constituting the cluster do not include a target element (common noun), four folder names are deemed to be the candidate work flow names, and the scores thereof are calculated. The result of score calculation for the candidate work flow names is obtained as shown in FIG. 7. In the example of the candidate "monthly-report" 5201 in FIG. 6B, the score calculation is performed as follows.

Since the layer distance (the distance from the main file) l=3 and the layer frequency (folder tree width) r=2, the structure score of the first term is 5*(0.5²)/2=0.63.

The occurrence frequency F ("monthly-report") is 2 since "monthly-report" appears twice, and the element score of the second term is 0.5*2=1.0.

Since the total number of constituent words is five, and "monthly-report" appears three times, the constituent word score of the third term is 1*3/5=0.6.

The total score is 0.63+1.0+0.6=2.23.

In another example, for an extracted work flow in which an estimate examination request is prepared, an approval is prepared, and then a contract is prepared as shown in FIG. 8A, a folder tree is reconstructed as shown in FIG. 8B. In this case, as a result of score calculation, the scores shown near the respective candidate work flow names in FIG. 8B are obtained. The score of "approval preparation" 7201 in FIG. 8B is "1.56", which is highest. The details of this calculation are as described below.

Since the layer distance (the distance from the main file) l=3 and the layer frequency (folder tree width) r=2, the structure score of the first term is 5*(0.5³)/2=0.31.

The occurrence frequency F ("approval preparation") is 2 since "approval preparation" appears twice, and the element score of the second term is 0.5*2=1.0.

Since the total number of constituent words is 28, "approval" appears five times, and "preparation" appears twice, the constituent word score of the third term is 1*(5/28+2/28)=0.25.

The total score is 0.31+1.0+0.25=1.56.

As for the score detail of "approval preparation" 7202 in FIG. 8B, since the layer distance (the distance from the main file) l=2 and the layer frequency (folder tree width) r=6, the structure score of the first term is 5*(0.5²)/6=0.21. The second term and the third term respectively are the same as above. The total score is 0.21+1.0+0.25=1.46.

In work flow name determination processing (step S304), the data processing unit 115 determines a candidate having a high score calculated in score calculation processing (step S303) to be the work flow name, and displays it in the display unit 116. In the example, "monthly-report" is determined to be the work flow name, and as shown in FIG. 9, the work flow name is displayed together with recommended operations (Copy, Rename) in the display unit 116. In FIG. 9, not only "monthly-report" but also "approval preparation" serving as a work flow name and an operation (Check-out) recommended regarding "approval preparation", and "weekly-report" and an operation (Copy) recommended regarding "weekly-report" are displayed.

Here, a description will be given for two exemplary solutions to a case where the same work flow name exists among already created work flow names.

In the first solution, if there is an element ("subject" element, "identifier" element, or "author" element) used in common by main files that is other than the target element estimated and extracted in target element estimation/extraction processing 301, this element is added to the work flow name. If there are a plurality of common elements, some of these common elements are added according to a predefined application order rule.

For example, the common elements are applied in descending order of the number of characters. If the same work flow name still exists even after some common elements are added, the remaining common elements are also added according to the application order rule until no common element remains.

In the example in FIG. 6A, an identifier element "201202" is added as an element used in common in the file names of the main files, and "monthly-report 201202" is determined to be the work flow name. In a case where no common element exists, or the same work flow name still exists even after all common elements are added, a new identifier (serial number etc.) is added to the work flow name.

In the second solution, the candidate work flow name that is the same as an already created work flow name may be deleted from the candidates, and the candidate having the highest score among the candidate work flow names that are different from the already created work flow names may be determined to be the work flow name.

These two solutions may be combined, and a penalty function for a work flow name that is the same as an already created name may be added to score calculation processing to determine the work flow name. For example, at the time of score calculation, a score taking account of already created work flow names is obtained by multiplying the number of work flow names having a target element that is the same as one in already created work flow names by a weight and subtracting the multiplication result, which serves as a penalty function, from the value of Expression 1.

For example, if the score is calculated using Expression 2 below, and the same name as the candidate having the highest score exists among already created work flow names, a common element other than the target element is added, if any, as in the first solution. In a case where no common element exists, or the same work flow name still exists even after all common elements are added, a new identifier (serial number etc.) is added to this work flow name.

candidate work flow name score'=(Expression 1)–penalty function(the number of already created work flow names having the same target element*weight)   Expression 2

Although some exemplary methods for determining a work flow name were described thus far, a different order of similar processing, or a combination thereof, is also applicable.

Although the target data is a file and the location where the target data is stored is a file path in the above description, they are not limited thereto. For example, the target data may be database data, and the location where the target data is stored may be a hierarchical structure of table names, attribute names, relations, or the like. Data models of a hierarchical structure of a data base include a nested set model, an adjacency list model, and the like.

The target data described as a file in the first embodiment represents target data subjected to clustering in the work flow extraction. An access path of the target data described as a file path in the first embodiment represents a name string (character string) that expresses a hierarchical order, folders, or the like for accessing the location where the target data is stored. Access to the target data is possible with this access path.

As described above, according to the first embodiment, an access path to major data is extracted based on the log type of operation history, and element estimation is performed using names on the access path, in contrast to the conventional technique with which it is not easy for a user to select an operation from a list of recommended operations. Then, target elements are extracted from the element estimation result, and the work flow name is determined based on the folder trees of these target elements. As a result, an appropriate name as a work flow name can be obtained. Furthermore, it is possible to allowing a user to easily understand the purpose of operation, and thereby improve the ease of selection by displaying the work flow name together with a recommended operation.

Second Embodiment

The configuration of the work flow name generation apparatus in FIG. 1 is used as an example of that of a work flow name generation apparatus in the second embodiment, as in the first embodiment. The processing flow in the second embodiment is similar to that in the first embodiment. The difference from the first embodiment lies in the method for calculating a score of a candidate work flow name.

In the first embodiment, the score is directly calculated using the shape (folder tree) of a folder structure. On the other hand, in the second embodiment, a score of a folder structure is indirectly calculated using a ratio (cover ratio) of main files included in a target folder to all main files (all main data) included in a folder tree.

Specifically, although the structure score of a folder tree of the first term is calculated using the depth (the distance from the main file) of the folder tree and its width in the first embodiment, it is calculated using the depth of the folder and the file cover ratio in the second embodiment. The cover ratio is a ratio of main files included in the folder to all main files. Further, in the first embodiment, calculation is performed collectively for multiple folder tree structures as shown in FIGS. 6B and 8B. On the other hand, in the second embodiment, calculation is performed separately for each folder tree as shown in FIGS. 10A and 10B, and lastly, the ratio of the number of main files included in the folder tree, which serves as a weight, is multiplied.

The result of score calculation for a candidate work flow name is obtained using Expression 3 below, as shown in FIGS. 10A and 11.

$$f(m)=C*(W_0*C(m)/l+W_1*F(m)/M+W_2\Sigma_{n=1}^{N}T_n)$$   Expression 3 f(m): labeling score m: candidate work flow name number (in the example, 1 to 4 since there are four candidates)

C: cover ratio of files in each folder tree to all main files (in the example, the above folder tree has a cover ratio of 40% and the below folder tree has a cover ratio of 60%)

$W_0$: weight for folder tree structure (in the example, 2 is used as a parameter)

c(m): cover ratio of files in folder tree (a higher cover ratio means a higher score)

l: distance of folder from target file (a lower-order folder has a higher score)

M: total number of folder names (in the example, four folders exist)

$W_1$: weight for distance of folder (in the example, 2 is used as a parameter)

F(m): frequency of mth folder name (file name)

$W_2$: weight for constituent word (in the example, 1 is used as a parameter)

N: total number of constituent words (in the example, five constituent words exist)

$T_n$: frequency of nth constituent word

In the example in FIG. 10B, calculation is performed as follows. Since the file names constituting the cluster do not include a target element (common noun), the folder names are deemed to be the candidate work flow names, and the scores are calculated. The result of score calculation for the candidate work flow names is obtained as shown in FIG. 11. Taking "monthly-report", which is determined to be the work flow name, as an example, the score calculation is performed as follows.

Since the cover ratio c(m) of the files in the folder tree is 1.0 and the layer distance l is 2, the structure score of the target element of the first term is 2*1.0/2=1.0.

Since "monthly-report" appears twice, and accordingly the frequency F(m) of the mth folder name (file name) is 2, the frequency score (element score) of the target element of the second term is 2*2/4=1.0.

Since the total number of the constituent words is five and "monthly-report" appears three times, the frequency score (constituent word score) of the constituent word of the third term is 1.0*3/5=0.6.

The cover ratio of the folder tree to all main files is 3/5=0.6, and the total score is 0.6*(1.0+1.0+0.6)=1.56.

In another example, for an extracted work flow in which an estimate examination request is prepared, an approval is prepared, and then a contract is prepared as shown in FIG. 8A, a folder tree is reconstructed as shown in FIG. 10B. In this case, as a result of score calculation, the scores shown near the respective candidate work flow names in FIG. 10B are obtained. The score of "overseas approval" 8201 in FIG. 10B is "0.65", which is highest. The details of this calculation are as described below.

Since the cover ratio c(m) of the files in the folder tree is 1.0 and the layer distance l=3, the structure score of the first term is 2*1.0/3=0.67.

Since 21 target elements appears, "overseas approval" appears once, and accordingly F (overseas approval), which is the frequency of "overseas approval", is 2, the element score of the second term is 2*1/21=0.1.

Since the total number of constituent words is 35, "overseas" appears once, and "approval" appears six times, the constituent word score of the third term is 1.0*(1/28+6/28) =0.2.

The cover ratio of the folder tree to all main files is 10/15=0.67, and the total score is 0.67*(0.67+0.1+0.2)=0.65.

As for the score detail of "estimate" 8202 in FIG. 10B, since the number of files within the folder tree is 10 and the number of files included in the folder is four, the cover ratio c(m) for the structure score of the first term is 0.4. Since the layer distance l=2, the structure score of the first term is 2*0.4/2=0.4.

Since 21 target elements appear, "estimate" appears once, and accordingly F (estimate), which is the frequency of "estimate", is 2, the element score of the second term is 2*1/ 21=0.1.

Since the total number of constituent words is 35 and "estimate" appears four times, the word score of the third term is 1.0*(4/35)=0.11.

The cover ratio of the folder tree to all main files is 10/15=0.67, and the total score is 0.67*(0.4+0.1+0.11)=0.41.

As described above, according to the second embodiment, in addition to the effect described in the first embodiment, the work flow name is created, taking account of the cover ratio of files. As a result, it is possible to create a work flow name that derives from more related folders among folders that manage files related to recommended work flows.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-239438, filed Oct. 30, 2012, which is hereby incorporated by reference herein in its entirety.

What is claimed is:

1. An information processing apparatus for extracting a similar operation pattern as a work flow from data operation history, comprising:

a processor and memory, wherein the processor executes instructions stored in memory, and wherein the instructions are configured as:
a work flow extraction unit configured to extract the work flow, based on data operation history data;
a data extraction unit configured to estimate and extract main data, which is major data within data that constitutes the work flow extracted by the work flow extraction unit;
a target element extraction unit configured to analyze a name string that expresses an access path for accessing the main data extracted by the data extraction unit, and estimate and extract a character string of a target element from the name string, wherein the target element extraction unit analyzes the character string and extract a common noun element as the target element; and
a determination unit configured to determine a work flow name, which is a name of the work flow, using a connection of the common noun as the target element extracted by the target element extraction unit.

2. The information processing apparatus according to claim 1,
further comprising a calculation unit configured to calculate a score that indicates an evaluation value of a candidate for the work flow name, using one of, or a combination of, a structure of the connection of the target element, a frequency of the target element, and a frequency of a constituent word of the target element,
wherein the determination unit determines the work flow name from the candidate for the work flow name, based on the score calculated by the calculation unit.

3. The information processing apparatus according to claim 2,
wherein the calculation unit calculates the score using a depth and a width of the structure of the connection of the target element.

4. The information processing apparatus according to claim 2,
wherein the calculation unit calculates the score using a depth of the structure of the connection of the target element, and a cover ratio that indicates a ratio of main data included in a folder corresponding to a target element to be a subject to all main data included in the connection of the target element.

5. The information processing apparatus according to claim 1,
further comprising an output unit configured to output the work flow name determined by the determination unit and a content of an operation recommended regarding a work flow corresponding to the work flow name, to a display device.

6. A method for controlling an information processing apparatus for extracting a similar operation pattern as a work flow from data operation history, the method comprising:

a processor and a memory of the information processing apparatus functioning to perform:
a work flow extracting step of extracting the work flow, based on data operation history data;
a data extracting step of estimating and extracting main data, which is major data within data that constitutes the work flow extracted in the work flow extracting step;
a target element extracting step of analyzing a name string that expresses an access path for accessing the main data extracted in the data extracting step, and estimating and extracting a character string of a target element from the name string, wherein the target element extracting step analyzes the character string and extracts a common noun element as the target element; and a determining step of determining a work flow name, which is a name of the work flow, using a connection of the common noun as target element extracted in the target element extracting step.

7. A non-transitory computer-readable recording medium that stores a program for causing a computer to perform a function of controlling an information processing apparatus for extracting a similar operation pattern as a work flow from data operation history, the program causing the computer to function as:

a work flow extraction unit configured to extract the work flow, based on data operation history data;

a data extraction unit configured to estimate and extract main data, which is major data within data that constitutes the work flow extracted by the work flow extraction unit;

a target element extraction unit configured to analyze a name string that expresses an access path for accessing the main data extracted by the data extraction unit, and estimate and extracting a character string of a target element from the name string, wherein the target element extraction unit analyzes the character string and extracts a common noun element as the target element; and a determination unit configured to determine a work flow name, which is a name of the work flow, using a connection of the common noun as the target element extracted by the target element extraction unit.

8. An information processing apparatus comprising:

a processor and a memory communicably connected and functioning as:

an acquisition unit configured to acquire a similar operation pattern as a work flow, based on data operation history data;

an extraction unit configured to extract a specific element from a character string that expresses an access path for accessing main data, which is major data within data that constitutes the work flow, wherein the extraction unit analyzes the character string and extracts a common noun element as the specific element; and a determination unit configured to determine a work flow name, which is a name of the work flow, using the specific element.

9. The information processing apparatus according to claim 8, further comprising a calculation unit configured to calculate a score that indicates an evaluation value of a candidate for the work flow name, using one of, or a combination of, a structure of a connection of the specific element, a frequency of the specific element, and a frequency of a constituent word of the specific element, wherein the determination unit determines the work flow name from the candidate for the work flow name, based on the score calculated by the calculation unit.

10. The information processing apparatus according to claim 9, wherein the calculation unit calculates the score using a depth and a width of the structure of the connection of the specific element.

11. The information processing apparatus according to claim 9, wherein the calculation unit calculates the score using a depth of the structure of the connection of the specific element, and a cover ratio that indicates a ratio of main data included in a folder corresponding to a specific element to be a subject to all main data included in the connection of the specific element.

12. A method for controlling an information processing apparatus, the method comprising:

a processor and a memory of the information processing apparatus functioning to perform:

an acquisition step of acquiring a similar operation pattern as a work flow, based on data operation history data;

an extracting step of extracting a specific element from a character string that expresses an access path for accessing main data, which is major data within data that constitutes the work flow, wherein the extracting step analyzes the character string and extracts a common noun element as the specific element; and a determining step of determining a work flow name, which is a name of the work flow, using the specific element.

13. A non-transitory computer-readable recording medium that stores a program for causing a computer to perform a function of controlling an information processing apparatus, the program causing the computer to function as:

an acquisition unit configured to acquire a similar operation pattern as a work flow, based on data operation history data;

an extraction unit configured to extract a specific element from a character string that expresses an access path for accessing main data, which is major data within data that constitutes the work flow, wherein the extraction unit analyzes the character string and extracts a common noun element as the specific element; and a determination unit configured to determine a work flow name, which is a name of the work flow, using the specific element.

* * * * *